(12) United States Patent
Copper

(10) Patent No.: US 11,105,226 B2
(45) Date of Patent: Aug. 31, 2021

(54) ROCKER ARM WITH AN OIL TROUGH

(71) Applicant: Koyo Bearings North America LLC, Greenville, SC (US)

(72) Inventor: Anthony Copper, Fountain Inn, SC (US)

(73) Assignee: Koyo Bearings North America LLC, Greenville, SC (US)

( * ) Notice: Subject to any disclaimer, the term of this patent is extended or adjusted under 35 U.S.C. 154(b) by 0 days.

(21) Appl. No.: 16/926,158

(22) Filed: Jul. 10, 2020

(65) Prior Publication Data

US 2021/0010395 A1 Jan. 14, 2021

Related U.S. Application Data

(60) Provisional application No. 62/872,568, filed on Jul. 10, 2019.

(51) Int. Cl.
| | |
|---|---|
| *F01L 1/18* | (2006.01) |
| *F01L 1/46* | (2006.01) |
| *F01M 9/10* | (2006.01) |
| *F16C 19/38* | (2006.01) |
| *F01L 1/24* | (2006.01) |

(52) U.S. Cl.
CPC ............... *F01L 1/185* (2013.01); *F01L 1/181* (2013.01); *F01L 1/182* (2013.01); *F01L 1/183* (2013.01); *F01L 1/24* (2013.01); *F01L 1/2422* (2013.01); *F01L 1/46* (2013.01); *F01M 9/107* (2013.01); *F16C 19/38* (2013.01); *F01L 1/462* (2013.01); *F01L 2305/02* (2020.05); *F01L 2810/02* (2013.01); *F16C 2360/22* (2013.01)

(58) Field of Classification Search
CPC . F01L 1/181; F01L 1/182; F01L 1/183; F01L 1/2422; F01L 1/46; F01L 1/462; F01L 2305/00; F01L 2810/02; F01M 9/107
USPC ............................... 123/90.36, 90.39, 90.41
See application file for complete search history.

(56) References Cited

U.S. PATENT DOCUMENTS

| | | | | |
|---|---|---|---|---|
| 3,881,788 A | * | 5/1975 | Kotauczek | F01M 9/107 384/155 |
| 4,245,523 A | * | 1/1981 | Wherry | F01L 1/181 123/90.36 |
| 4,961,407 A | * | 10/1990 | McWhirter | F01L 1/183 123/90.41 |

* cited by examiner

*Primary Examiner* — Jorge L Leon, Jr.
(74) *Attorney, Agent, or Firm* — Nelson Mullins Riley & Scarborough LLP

(57) ABSTRACT

A rocker arm assembly having a rocker arm including a pair of sidewalls, each sidewall defining a support aperture, a rocker arm support including a pair of opposed bearing support arms, each bearing support arm being disposed within a corresponding support aperture of the rocker arm and defining a lubrication groove extending along an outer surface thereof, and a pair of radial roller bearings, each including an inner cup, an outer cup, and a plurality of rollers disposed therebetween, wherein each radial roller bearing is disposed both on a corresponding bearing support arm and within a corresponding support aperture.

12 Claims, 5 Drawing Sheets

US 11,105,226 B2

ROCKER ARM WITH AN OIL TROUGH

CLAIM OF PRIORITY

This application claims priority to U.S. provisional patent application No. 62/872,568 filed Jul. 10, 2019, the disclosure of which is incorporated by reference herein.

FIELD OF THE INVENTION

The present invention relates generally to rocker arm assemblies. More particularly, the present invention relates to designs and assembly methods of rocker arm assemblies including oil flow passages to improve lubrication of the corresponding bearings.

BACKGROUND OF THE INVENTION

This invention relates generally to valve operating mechanisms for use in internal combustion engines and, more particularly, to an oscillating rocker arm assembly and rocker arm support for radial bearings. Referring now to the drawings, FIG. 7 illustrates a portion of an internal combustion engine 10 and the relative position of a valve cover 12, push rod 14, cylinder head 16, poppet valve 18, valve stem 20, valve spring 22, and valve spring retainer 24. Those engine parts are conventional and are illustrated to show the environment of the present invention. Referring additionally to FIG. 8, a typical rocker arm assembly 30 includes a rocker arm 31 and a pair of radial roller bearings 32 supported on a rocker arm support 34 that is mounted perpendicularly on a support stud 36 extending from the head of the engine. Each radial roller bearing 32 is received on a corresponding bearing support arm 38 of the rocker arm support 34 and includes an inner cup 40, an outer cup 42, and a plurality of rollers 44 disposed therebetween. Optionally, the rocker arm can be supported on the bearing support arms wherein the outer surfaces of the arms 38 serve as an inner raceway for the needle roller bearings. The use of an inner cup 40 allows the use of a non-cylindrical support arm and facilitates the use of powder metal forming for the rocker arm support.

As best seen in FIG. 8, typical bearing support arms 38 of a rocker arm support 34 include a number of semi-cylindrical surfaces 50 for receiving the corresponding radial roller bearing 32 thereon. For those applications in which each roller bearing includes a closed end outer cup 42, lubrication from outside the rocker arm assembly 30 to inside the bearings may be reduced as compared to those instances in which the bearings include an open end outer cup (not shown). As such, there is a need for rocker arm assemblies having improved internal flow pathways to facilitate lubrication flow to the corresponding bearings.

The present invention recognizes and addresses considerations of prior art constructions and methods.

SUMMARY OF THE INVENTION

One embodiment of the present disclosure provides a rocker arm assembly having a rocker arm including a pair of sidewalls, each sidewall defining a support aperture, a rocker arm support including a pair of opposed bearing support arms, each bearing support arm being disposed within a corresponding support aperture of the rocker arm and defining a lubrication groove extending along an outer surface thereof, and a pair of radial roller bearings, each including an inner cup, an outer cup, and a plurality of rollers disposed therebetween, wherein each radial roller bearing is disposed both on a corresponding bearing support arm and within a corresponding support aperture.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
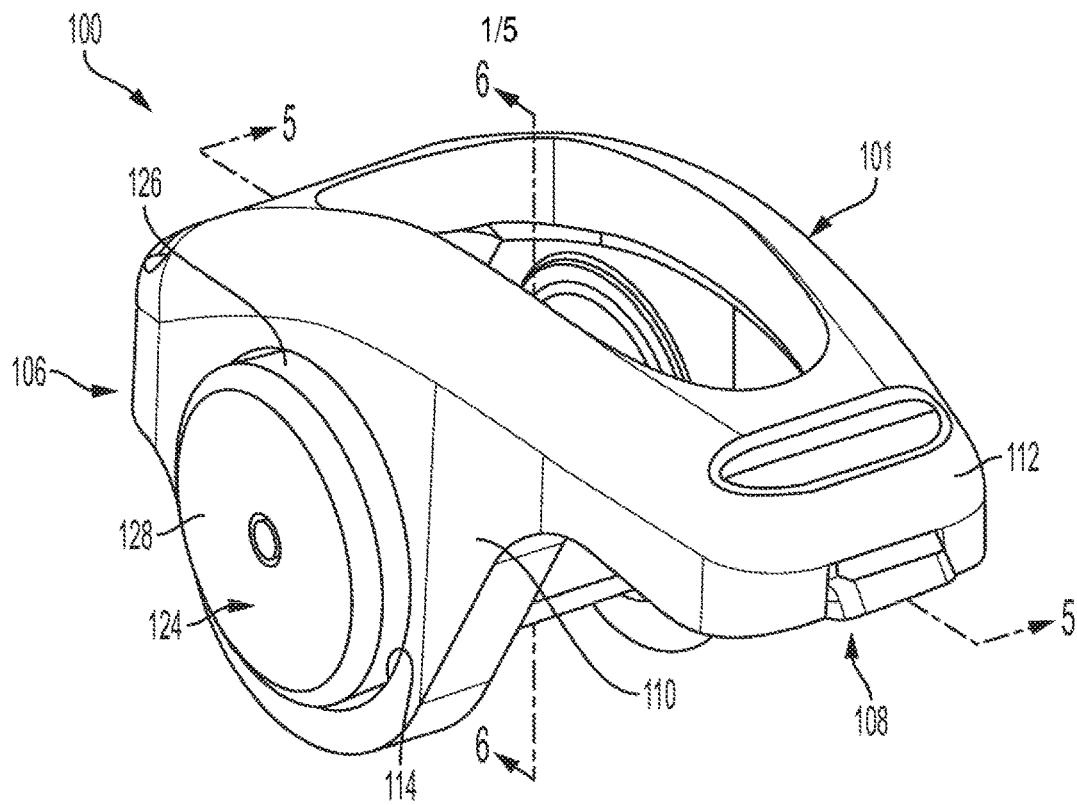
FIG. 1 is a perspective view of a rocker arm assembly in accordance with an embodiment of the present disclosure.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
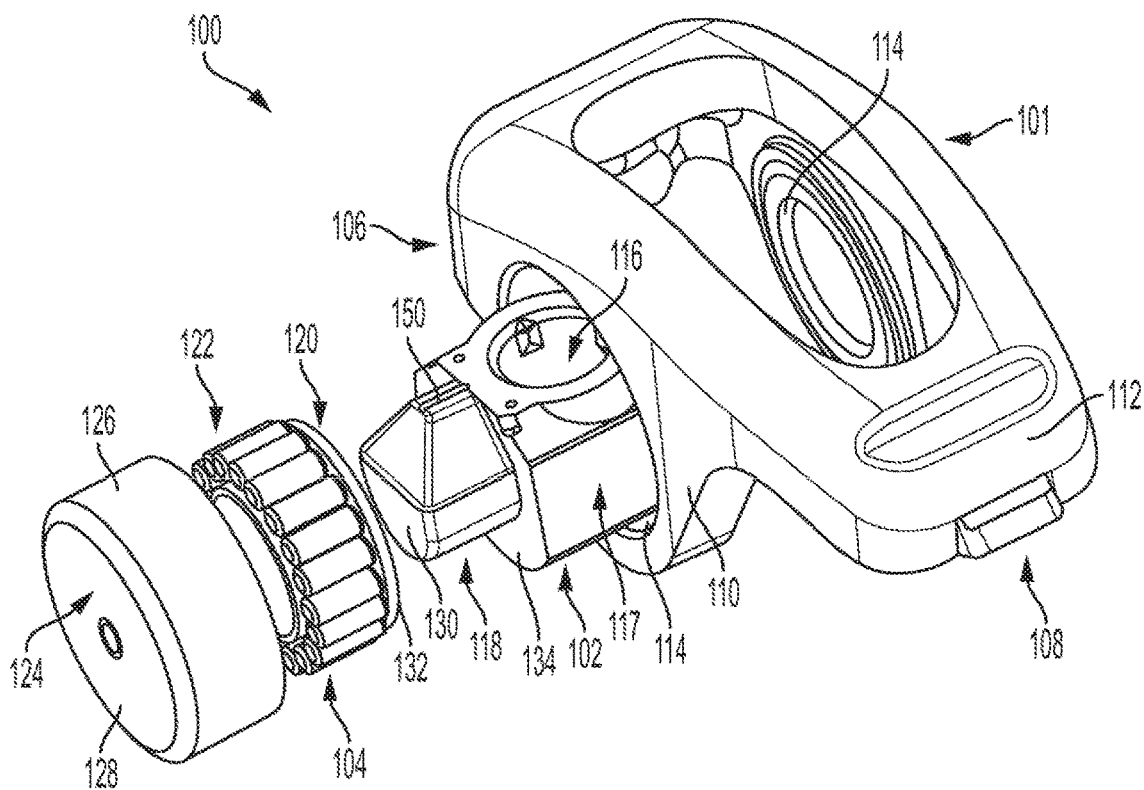
FIG. 2 is an exploded view of the rocker arm assembly shown in FIG. 1.

Referring now to FIGS. 1 and 2, an embodiment of a rocker arm assembly 100 in accordance with the present disclosure includes a rocker arm 101 supported on a rocker arm support member 102 by a pair of radial roller bearings 104, as would be used in an internal combustion engine. Rocker arm 101 has a first end 106 for engagement with a hydraulic lash adjuster, not shown, and second end 108 for engagement with a valve stem of a poppet valve, not shown. The rocker arm assembly 100 is mounted on the engine by a stud, cap screw, or other stud means, not shown. As shown, rocker arm 101 is of a cast configuration including a pair of side walls 110 connected by a pair of end flanges 112, providing added rigidity. Each side wall 110 includes a mounting aperture 114 for receiving a corresponding radial roller bearing 104 therein. Note, however, the rocker arm assembly 100 of the present invention may be employed with stamped or cast rocker arms of various configurations.

Figure 3:
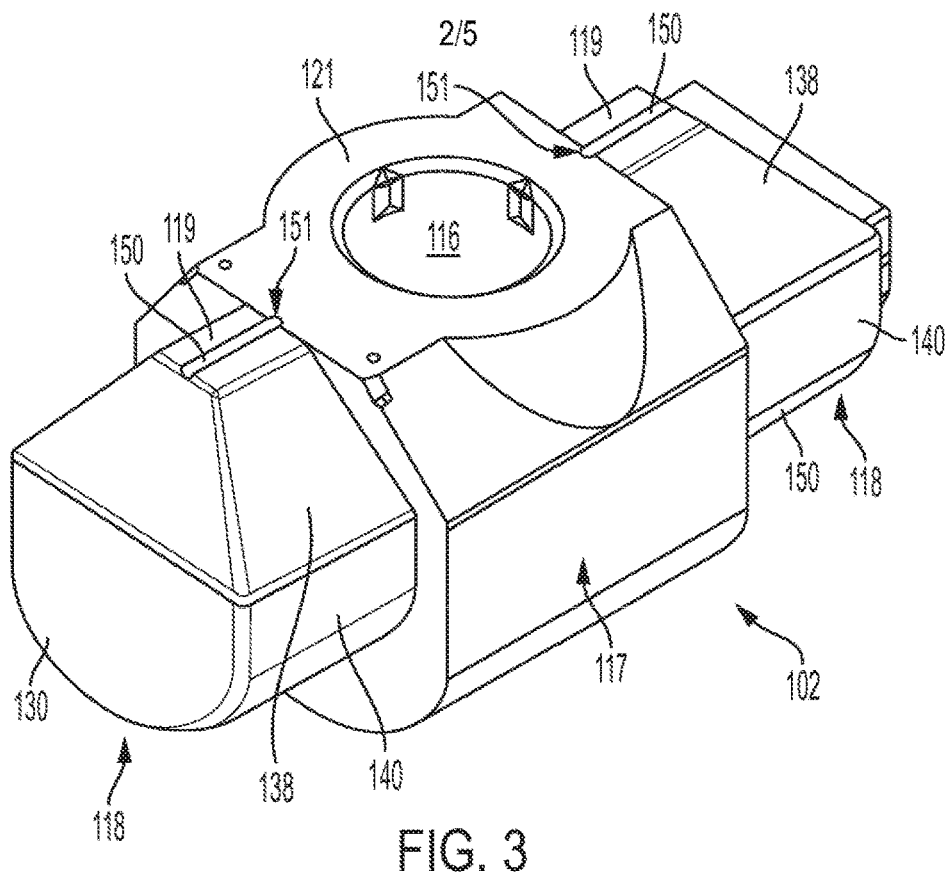
FIG. 3 is a perspective view of a rocker arm support, in accordance with an embodiment of the present disclosure, of the rocker arm assembly shown in FIG. 1.
Figure 4:
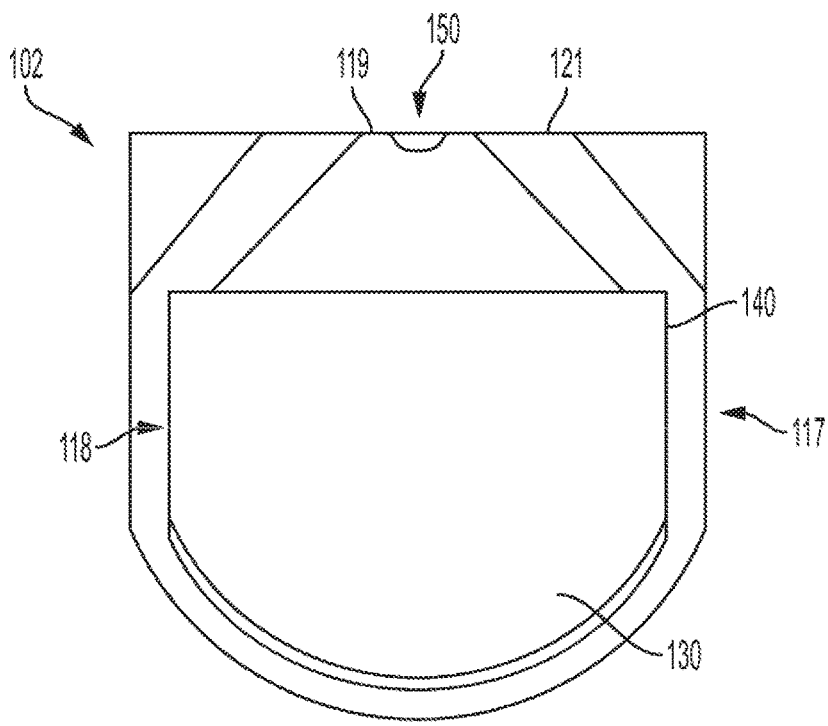
FIG. 4 is a side view of the rocker arm support shown in FIG. 3.
Figure 5:
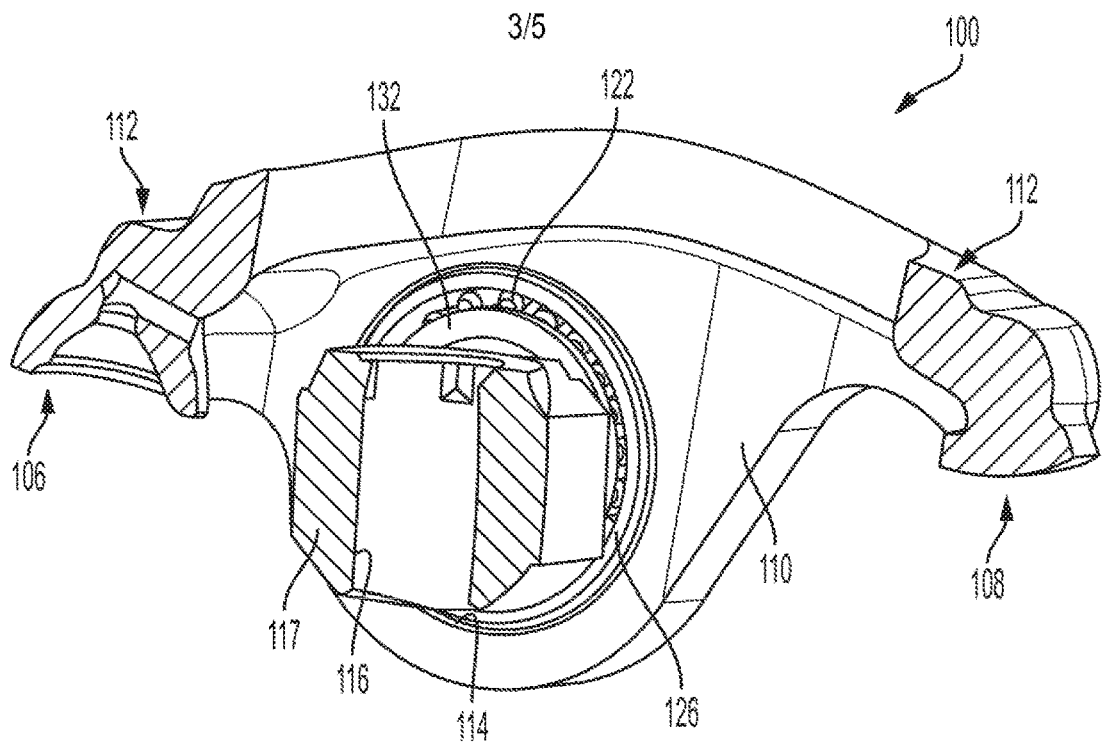
FIG. 5 is a cross-sectional view of the rocker arm assembly shown in FIG. 1, taken along line 5-5.

Referring additionally to FIGS. 3 and 4, rocker arm support member 102 has a substantially vertical bore 116 for receiving the stud means to mount the rocker arm assembly 100 to the engine. Rocker arm support member 102 has a body portion 117 and a pair of bearing support arms 118 which extend in opposite directions along a common axis perpendicular to the stud means. Radial roller bearings 104 are mounted along that axis over support arms 118 by inner bearing sleeves 120 which provide inner raceways for roller members 122. As shown, a top surface 119 of each bearing support arm includes an elongated trough 150, or groove, that extends along its length, thereby forming an oil reservoir between the inner cylindrical surface of the corresponding inner sleeve 120 and the bearing support arm 118. Roller bearings 104 may employ a full complement of needle rollers, as illustrated, or may employ other types of roller members, with or without retainers. Roller members 122 are within an annulus formed between inner sleeves 120 and outer bearing cups 124. Outer bearing cups 124 have a common axis and are rigidly mounted in the two spaced apart side walls 110 of rocker arm 101 by any of various fixing means. In the embodiment shown, for example, mounting apertures 114 in side walls 110 provide an interference fit with bearing cups 124. Rocker arm support member 102 has a cross-section smaller than the mounting apertures 114 in the side walls 110 of rocker arm 101, thus allowing rocker arm support member 102 to be inserted through one of the apertures during assembly, as best seen in FIG. 2.

Figure 6:
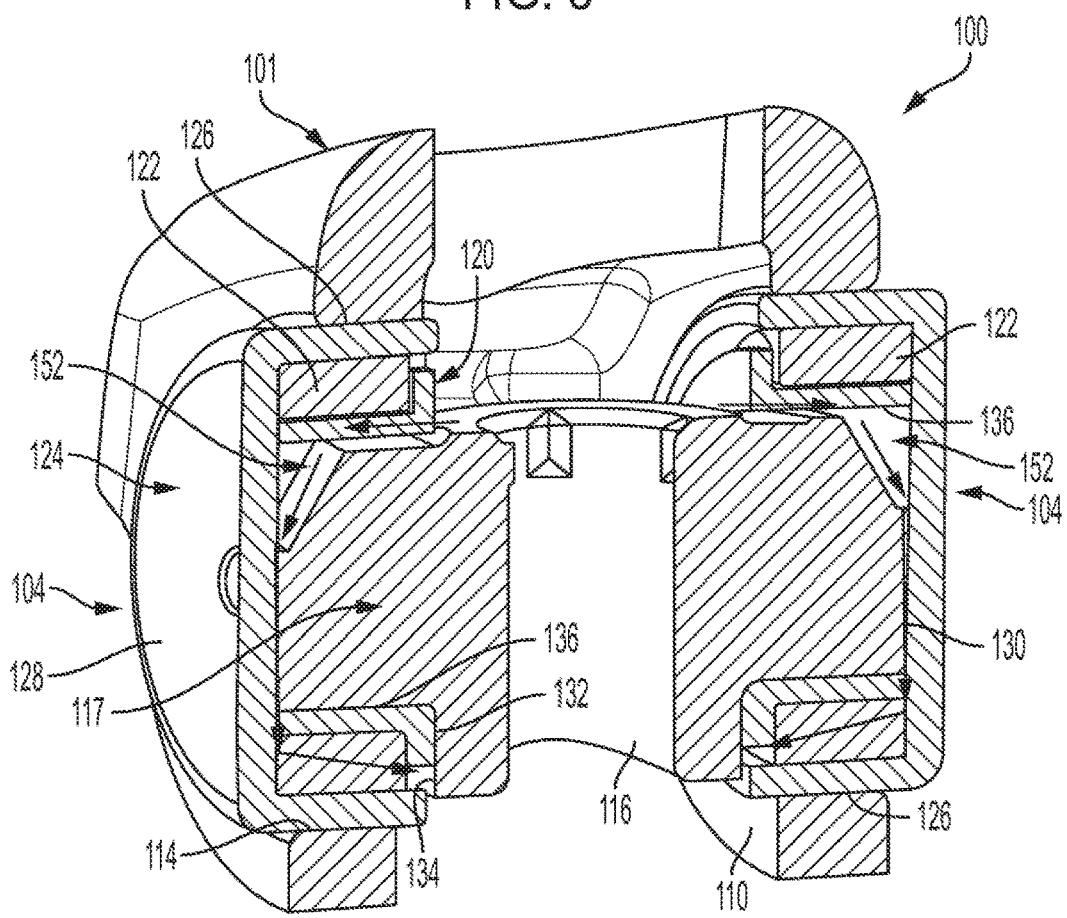
FIG. 6 is a cross-sectional view of the rocker arm assembly shown in FIG. 1, taken along line 6-6.
Figure 7:
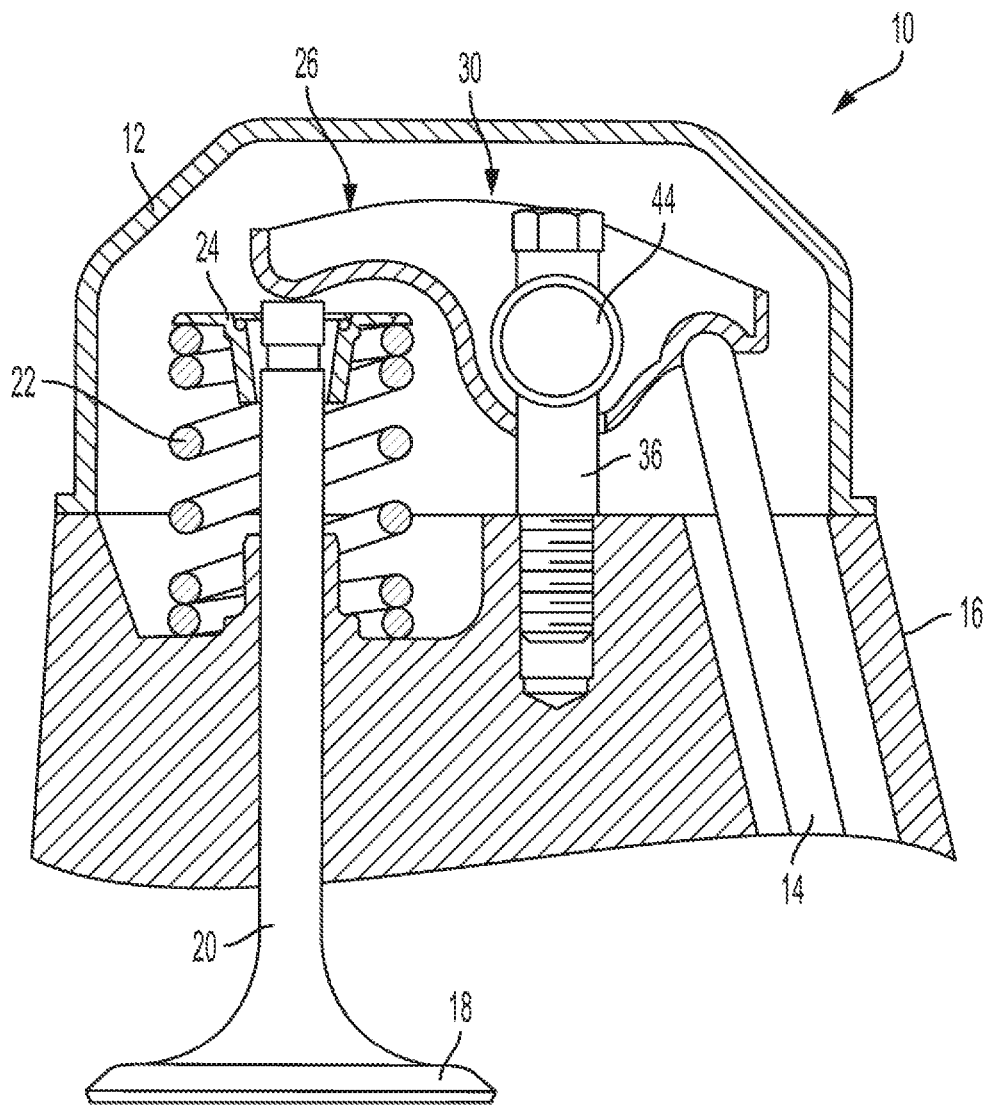
FIG. 7 is a side view, in partial cross-section, of a portion of an internal combustion engine illustrating a prior art rocker arm assembly.
Figure 8:
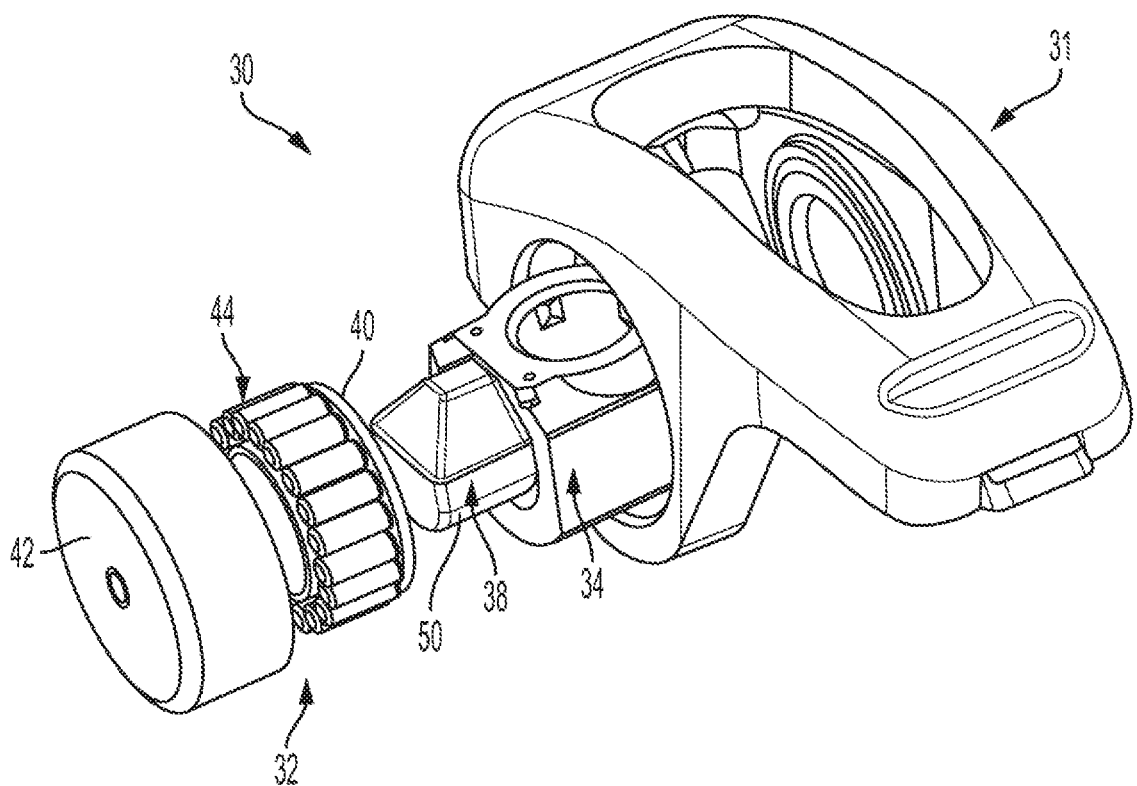
FIG. 8 is an exploded view of the prior art rocker arm assembly shown in FIG. 7.

As shown, outer bearing cups 124 are of the "closed" type. That is, each bearing cup has a cylindrical side wall 126, and a solid top wall 128 that is perpendicular thereto. As best seen in FIG. 6, the inner surface of top wall 128 is engageable with ends of roller members 122 to limit outward axial movement of the roller members, and the outer surface of the side wall 126 is received in the corresponding mounting aperture 114 in an interference fit. Additionally, the inner surface of top wall 128 abuts the end surface 130 of the corresponding bearing support arm 118 so that radial roller bearing 104 is properly positioned within rocker arm 101. In alternate embodiments, top wall 128 of outer cup 124 may be spaced from the end surface 130 of bearing support arm 118 to allow for enhanced flow of lubrication. Preferably, inner sleeves 120 and outer cups 124 are formed by a drawing process.

Referring again to FIG. 6, inner bearing sleeves 120 are formed with outwardly extending flanges 132 that are engageable with the ends of roller members 122 to limit inward axial movement. As well, outwardly extending flanges 132 abut planar surfaces 134 of rocker arm support member 102 to ensure proper axial location of inner bearing sleeves 120. Referring additionally to FIG. 3, a pair of recesses 151 are formed in the top surface 121 of the body portion 117 of rocker arm support 102, each recess 151 being adjacent the innermost end of a corresponding oil reservoir 150. As best seen in FIG. 6, the pair of recesses 151 ensures that lubrication flow to oil reservoirs 150 is possible even when flanges 132 of inner bearing sleeves 120 are mounted against the planar surfaces 134 of rocker arm support 102. A cylindrical wall 136 of each inner bearing sleeve 120 provides an inner raceway for roller members 122 and facilitates use of powder metal forming of rocker arm support member 102 by allowing bearing support arms 118 to have a non-cylindrical configuration, as described below. Note, however, in alternate embodiments each bearing support arm may have a circular cross-section.

As best seen in FIG. 3, rocker arm support member 102 may include beveled surfaces 138 and flat side surfaces 140. The beveled and flat surfaces facilitate manufacture of rocker arm support member 102 by powder metal forming. Because roller members 122 ride on inner raceways provided by inner sleeves 120, and because the greatest force from the rocker arm 101 is on the lower portions of roller bearings 104, those beveled and flat surfaces on the top and side portions of bearing support arms 118 of rocker arm support member 102 do not affect operation of the rocker arm assembly.

As best seen in FIG. 6, an assembled rocker arm assembly 100 in accordance with the present disclosure includes rocker arm 101 that is pivotably supported on a rocker arm support 102 by a pair of radial roller bearings 104, as previously discussed. Each radial roller bearing 104 includes a closed end outer cup 124, the use of which on radial bearings can limit the flow of lubrication from outside the rocker arm assembly 100 into the radial roller bearings 104. As noted, an upper surface of each bearing support arm 118 of the rocker arm support 102 includes an oil reservoir 150 in the form of an elongated trough or groove. Each oil reservoir 150 is configured to gather and direct oil into the corresponding radial roller bearing 104. As indicated by the arrows 152 in FIG. 6, the internal supply of oil may be provided by the valve train push rod and is then directed outwardly into the radial roller bearings 104 by the oil reservoirs 150. Note, more than one oil reservoir 150 may be formed in the outer surfaces of the bearing support arms 118 where they come into contact with the inner sleeve 120 of the corresponding radial roller bearing 104.

While one or more preferred embodiments of the invention are described above, it should be appreciated by those skilled in the art that various modifications and variations can be made in the present invention without departing from the scope and spirit thereof. Additionally, the vibration isolator may be constructed of any material found to be suitable for the intended purpose. It is intended that the present invention cover such modifications and variations as come within the scope and spirit of the appended claims and their equivalents.

The invention claimed is:

1. A rocker arm assembly comprising:
    a rocker arm including a first sidewall defining a first support aperture, and a second sidewall defining a second support aperture;
    a rocker arm support member including a first bearing support arm and an opposed second bearing support arm, each bearing support arm defining at least one lubrication groove extending along respective outer surfaces of the first and second bearing support arms; and
    a first radial roller bearing and a second radial roller bearing, each radial roller bearing including a plurality of rollers disposed between an inner cup and an outer cup,
    wherein the first bearing support arm is disposed within the first support aperture via the first radial bearing, and the second bearing support arm is disposed within the second support aperture via the second radial roller bearing.

2. The rocker arm assembly of claim 1, wherein each at least one lubrication groove extends along an upper portion of the respective outer surfaces.

3. The rocker arm assembly of claim 2, wherein each at least one lubrication groove includes a plurality of lubrication grooves.

4. The rocker arm assembly of claim 2, wherein each inner cup has an inner cylindrical surface that is directly adjacent to a corresponding outer surface of the respective outer surfaces.

5. The rocker arm assembly of claim 2, wherein each outer cup includes a cylindrical side wall extending from a solid top wall.

6. The rocker arm assembly of claim 2, wherein each bearing support arm is cylindrical.

7. An internal combustion engine comprising:
a cylinder head;
a poppet valve including a valve stem;
a valve spring disposed around the valve stem; and
the rocker arm assembly of claim 1,
wherein the rocker arm support member is mounted to the cylinder head via a support stud, and the rocker arm is pivotally mounted to the rocker arm support member such that a first end of the rocker arm engages the valve stem.

8. The internal combustion engine of claim 7, further comprising a hydraulic lash adjuster configured to engage a second end of the rocker arm.

9. The rocker arm assembly of claim 7, wherein each at least one lubrication groove extends along an upper portion of the respective outer surfaces.

10. The rocker arm assembly of claim 7, wherein each at least one lubrication groove includes a plurality of lubrication grooves.

11. The rocker arm assembly of claim 7, wherein each inner cup has an inner cylindrical surface that is directly adjacent to a corresponding outer surface of the respective outer surfaces.

12. The rocker arm assembly of claim 7, wherein each outer cup includes a cylindrical side wall extending from a solid top wall.

* * * * *